United States Patent
Sugita et al.

(10) Patent No.: US 11,760,893 B2
(45) Date of Patent: Sep. 19, 2023

(54) INK, IMAGE FORMING APPARATUS, AND IMAGE FORMING METHOD

(71) Applicant: RICOH COMPANY, LTD., Tokyo (JP)

(72) Inventors: Kento Sugita, Tokyo (JP); Yuuki Yokohama, Kanagawa (JP); Azumi Miyaake, Tokyo (JP); Satoshi Takahashi, Kanagawa (JP); Koichiro Oyama, Kanagawa (JP); Mizuki Kuroha, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 17/370,787

(22) Filed: Jul. 8, 2021

(65) Prior Publication Data

US 2022/0010155 A1   Jan. 13, 2022

(30) Foreign Application Priority Data

Jul. 10, 2020 (JP) .................. 2020-119254

(51) Int. Cl.
*C09D 11/322* (2014.01)
*C09D 11/033* (2014.01)
*B41J 11/00* (2006.01)
*C09D 11/10* (2014.01)
*C09D 11/101* (2014.01)
*C09D 11/037* (2014.01)

(52) U.S. Cl.
CPC ....... *C09D 11/322* (2013.01); *B41J 11/00214* (2021.01); *C09D 11/033* (2013.01); *C09D 11/037* (2013.01); *C09D 11/10* (2013.01); *C09D 11/101* (2013.01)

(58) Field of Classification Search
CPC ....... C09D 11/322; C09D 11/30; C09D 11/08; C09D 11/10; B41M 5/0047; B41J 11/00214; B41J 11/002

See application file for complete search history.

(56) References Cited

U.S. PATENT DOCUMENTS

| 2005/0006041 | A1* | 1/2005 | Gane ................. C09D 7/40 106/491 |
| 2017/0260405 | A1* | 9/2017 | Kumai ................. C09D 11/102 |
| 2018/0094152 | A1* | 4/2018 | Sakaguchi ........... C09D 11/102 |
| 2019/0185690 | A1 | 6/2019 | Umemura et al. |
| 2021/0009822 | A1 | 1/2021 | Sugita et al. |
| 2021/0292582 | A1* | 9/2021 | Hanazawa ........... C09D 11/107 |

FOREIGN PATENT DOCUMENTS

| JP | 2018-039872 | 3/2018 |
| JP | 2018-196952 | 12/2018 |
| JP | 2019-025651 | 2/2019 |
| JP | 2019-162755 | 9/2019 |

* cited by examiner

*Primary Examiner* — John Zimmermann
(74) *Attorney, Agent, or Firm* — Grüneberg and Myers PLLC

(57) ABSTRACT

An ink including a pigment, water, and a resin is provided. An image formed with the ink on a print medium has a tack force of 6 gf or greater but 13 gf or less when measured at a probe temperature of 100 degrees C., where the image is a solid image formed at a resolution of 1,200 dpi, subsequently irradiated with light of 395 nm for 0.6 seconds, and left to stand at normal temperatures and normal humidities for 30 seconds.

13 Claims, 2 Drawing Sheets

INK, IMAGE FORMING APPARATUS, AND IMAGE FORMING METHOD

CROSS-REFERENCE TO RELATED APPLICATIONS

This patent application is based on and claims priority pursuant to 35 U.S.C. § 119(a) to Japanese Patent Application No. 2020-119254, filed on Jul. 10, 2020, in the Japan Patent Office, the entire disclosure of which is hereby incorporated by reference herein.

BACKGROUND

Technical Field

The present disclosure relates to an ink, an image forming apparatus, and an image forming method.

Description of the Related Art

Inkjet printers have advantages such as low noise, low running costs, and easy availability of color printing, and are widely spread as output devices for digital signals.

In recent years, low- or non-absorbable print media such as coat paper and plastic films are used as print media to which inkjet printing is applied, and inks for these print media are developed.

However, when images are inkjet-printed on these low- or non-absorbable print media, there is a problem that the inks fix poorly on the print media because the inks do not dry by permeation. In order to deal with this problem, techniques of increasing the resin content in the inks are known.

When the resin content in the inks is increased, what becomes the obstacle is storage stability. Particularly when the inks are stored in an environment at a temperature higher than the glass transition temperature Tg of the resins, the inks tend to thicken.

SUMMARY

According to one aspect of the present disclosure, an ink includes a pigment, water, and a resin. An image formed with the ink on a print medium has a tack force of 6 gf or greater but 13 gf or less when measured at a probe temperature of 100 degrees C., where the image is a solid image formed at a resolution of 1,200 dpi, subsequently irradiated with light of 395 nm for 0.6 seconds, and left to stand at normal temperatures and normal humidities for seconds.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
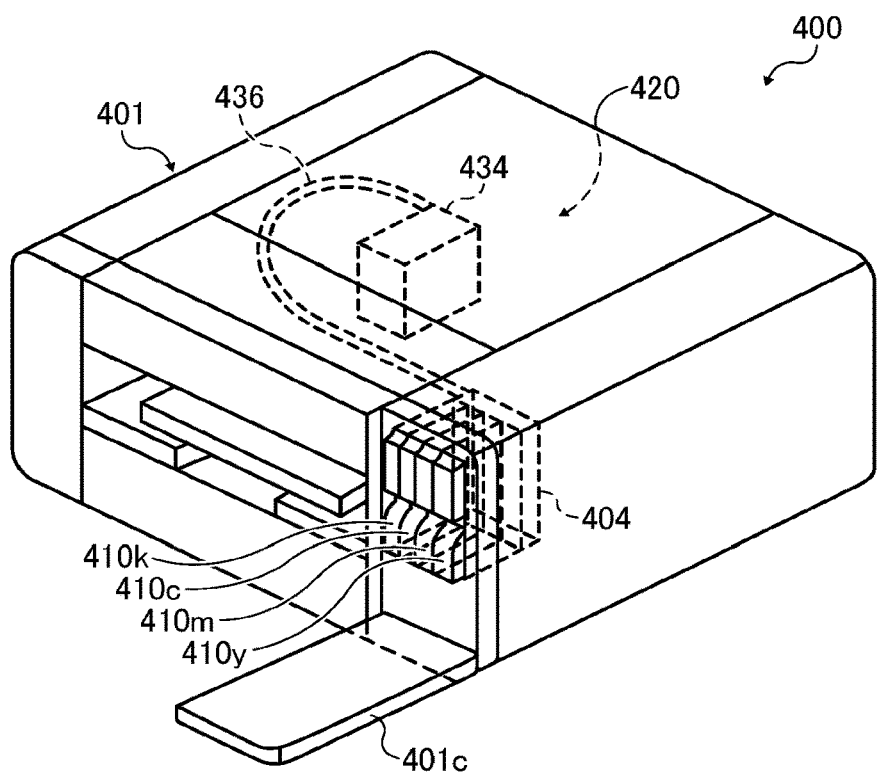
FIG. 1 is a view illustrating an image forming apparatus using an ink according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide an ink that has a good storage stability while ensuring fixability.

The present disclosure is directed to an ink as described in (1) below, but also includes (2) to (8) described below as the embodiments of the present disclosure.

(1) An ink including:
a pigment;
water; and
a resin,
wherein an image formed with the ink on a print medium has a tack force of 6 gf or greater but 13 gf or less when measured at a probe temperature of 100 degrees C.,
wherein the image is a solid image formed at a resolution of 1,200 dpi, subsequently irradiated with light of 395 nm for 0.6 seconds, and left to stand at normal temperatures and normal humidities for 30 seconds.

(2) The ink according to (1),
wherein the resin includes a resin A having a glass transition temperature Tg of 80 degrees C. or higher and a resin B having a glass transition temperature Tg of 12 degrees C. or higher but 41 degrees C. or lower.

(3) The ink according to (1) or (2),
wherein a mass ratio of the resin A to the resin B is 0.5 or greater but 5.0 or less.

(4) The ink according to any one of (1) to (3), further including
a silicone-based surfactant in an amount of 0.05% by mass or greater but 1.00% by mass or less.

(5) An image forming apparatus including:
the ink according to any one of (1) to (4); and
a discharging unit configured to discharge the ink to a print medium.

(6) The image forming apparatus according to (5), further including
an irradiation unit configured to irradiate the print medium to which the ink is applied with ultraviolet rays.

(7) An image forming method including
discharging the ink according to any one of (1) to (4) to a print medium to form an image.

(8) The image forming method according to (7), further including
irradiating the print medium to which the ink is applied with ultraviolet rays.

In order to improve the fixability of an ink, an ink film needs both of hardness and flexibility. This is because the ink film is brittle when the ink film is extremely hard, whereas the ink film is viscous and elongated when the ink film is extremely soft. The inventors of the present invention have found that an ink film has a balance between hardness and flexibility when the tack force of an image printed with the ink is 6 gf or greater but 13 gf or less when measured at a probe temperature of 100 degrees C. There is a tendency that resins that make ink films more flexible are more plasticized by solvents during storage at a high temperature or during storage for a long term. The inventors of the present invention have found that the storage property of an ink is also sufficiently ensured when the tack force of an image printed with the ink is 6 gf or greater but 13 gf or less when measured at a probe temperature of 100 degrees C.

The present disclosure is particularly useful when UV irradiation is used as a drying device. When a sheet of paper is dried by heating or dried by IR, there may occur a problem that the sheet of paper curls or deforms. Hence, UV drying that does not cause a sheet of paper to curl is paid attention.

However, UV has a weak drying power and cannot dry and fix ordinary inks well. However, when the resin content is simply increased in order to improve fixability, this in turn degrades storage stability of the ink.

The ink of the present disclosure has an effect of being able to satisfy both of storage stability and fixability even when a drying unit having a relatively low drying power such as UV drying is used.

In order to form an ink film to print an image having a tack force of 6 gf or greater but 13 gf or less when measured at a probe temperature of 100 degrees C., there is a need that the ink contain both of a resin for improving hardness and a resin for improving flexibility at an appropriate ratio. A resin having a glass transition temperature Tg of 80 degrees C. or higher makes an ink film hard, whereas a resin having a glass transition temperature Tg of 12 degrees C. or higher but 41 degrees C. or lower makes an ink film flexible. For example, when the mass ratio (resin A/resin B) of the resin A having Tg of 80 degrees C. or higher to the resin B having Tg of 12 degrees C. or higher but 41 degrees C. or less is 0.5 or greater but 5.0 or less, the tack force of the image printed with the ink is 6 gf or greater but 13 gf or less when measured at a probe temperature of 100 degrees C.

In order to form an image exhibiting a tack force of 6 gf or greater but 13 gf or less measured at a probe temperature of 100 degrees C. after a lapse of 12 hours or longer after the image is printed with the ink and then dried, the ink needs to satisfy the requirements described below.

<Ink>

For example, an organic solvent, water, a coloring material, a resin, and additives used in the ink will be described below.

<Organic Solvent>

The organic solvent used in the present disclosure is not particularly limited, and a water-soluble organic solvent can be used. Examples of the water-soluble organic solvent include, but are not limited to, polyvalent alcohols, polyvalent alcohol alkyl ethers, polyvalent alcohol aryl ethers, nitrogen-containing heterocyclic compounds, amides, amines, and sulfur-containing compounds.

Specific examples of the polyvalent alcohols include, but are not limited to, ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hxanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and petriol.

Examples of the polyvalent alcohol alkyl ethers include, but are not limited to, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyvalent alcohol aryl ethers include, but are not limited to, ethylene glycol monophenyl ether, and ethylene glycol monobenzyl ether.

Examples of the nitrogen-containing heterocyclic compounds include, but are not limited to, 2-pyrrolidone, N-methyl-2-pyrrolidone, N-hydroxyethyl-2-pyrrolidone, 1,3-dimethyl-2-imidazolidinone, ε-caprolactam, and γ-butyrolactone.

Examples of the amides include, but are not limited to, formamide, N-methyl formamide, N,N-dimethyl formamide, 3-methoxy-N,N-dimethyl propionamide, and 3-butoxy-N,N-dimethyl propionamide.

Examples of the amines include, but are not limited to, monoethanolamine, diethanolamine, and triethylamine.

Examples of the sulfur-containing compounds include, but are not limited to, dimethyl sulfoxide, sulfolane, and thiodiethanol.

Examples of other organic solvents include, but are not limited to, propylene carbonate and ethylene carbonate.

Since the organic solvent serves as a humectant and also imparts a good drying property, it is preferable to use an organic solvent having a boiling point of 250 degrees C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkyl ethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application.

In terms of the drying property and discharging reliability of the ink, the proportion is preferably from 10 to 60 percent by mass and more preferably from 20 to 60 percent by mass.

<Water>

The proportion of water in the ink has no particular limit and can be suitably selected to suit to a particular application. In terms of the drying property and discharging reliability of the ink, the proportion is preferably from 10 to 90 percent by mass and more preferably from 20 to 60 percent by mass.

<Coloring Material>

The coloring material has no particular limit. For example, pigments and dyes are suitable.

The pigment includes inorganic pigments and organic pigments. These can be used alone or in combination. In addition, it is possible to use a mixed crystal as a pigment.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 to 15 percent by mass and more preferably from 1 to 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments. Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

<Pigment Dispersion>

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off from the pigment dispersion with a filter, a centrifuge, etc. preferably followed by degassing.

<Resin>

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl-chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

In terms of fixability and a storage property, it is preferable that the ink contain two kinds of resins, namely a resin A having a glass transition temperature Tg of 80 degrees C. or higher and a resin B having a glass transition temperature Tg of 12 degrees C. or higher but 41 degrees C. or lower. Moreover, it is preferable that the weight ratio (resin A)/(resin B) of the resin A to the resin B be 0.5 or greater but 5.0 or less.

<Additive>

Ink may further optionally contain a surfactant, a defoaming agent, a preservative and fungicide, a corrosion inhibitor, a pH regulator, etc.

<Surfactant>

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-containing surfactant has no particular limit and can be suitably selected to suit to a particular application. Examples thereof include a compound in which the polyalkylene oxide structure represented by the following General formula S-1 is introduced into the side chain of the Si site of dimethyl polysiloxane.

General formula (S-1)

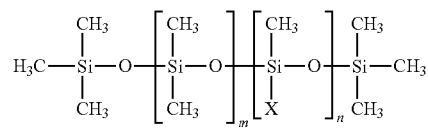

$X = \text{-}R(C_2H_4O)_a (C_3H_6O)_b R'$

In the General formula S-1, "m", "n", "a", and "b" each, respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

In terms of a storage property, it is preferable that the ink contain a silicone-based surfactant in an amount of 0.05% by mass or greater but 1.00% by mass or less.

A fluorosurfactant in which the number of carbon atoms replaced with fluorine atoms is from 2 to 16 and more preferably from 4 to 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these, polyoxyalkylene ether polymer compounds having a perfluoroalkyl ether group in its side chain are preferable because they do not foam easily and the fluorosurfactant represented by the following General formula F-1 or General formula F-2 is particularly preferable.

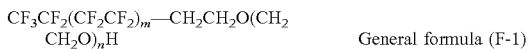

$CF_3CF_2(CF_2CF_2)_m—CH_2CH_2O(CH_2CH_2O)_nH$  General formula (F-1)

In General formula F-1, "m" is preferably 0 or an integer of from 1 to 10 and "n" is preferably 0 or an integer of from 1 to 40 in order to provide water solubility.

$C_nF_{2n+1}—CH_2CH(OH)CH_2—O—(CH_2CH_2O)_a—Y$  General formula (F-2)

In General formula F-2, Y represents H, $C_mF_{2m+1}$, where "m" is an integer of from 1 to 6, $CH_2CH(OH)CH_2—C_mF_{2m+1}$, where m represents an integer of from 4 to 6, or $C_pH_{2p+1}$, where p represents an integer of from 1 to 19. "n" represents an integer of from 1 to 6. "a" represents an integer of from 4 to 14.

Products available on the market may be used as the fluorosurfactant. Specific examples of the products available on the market include, but are not limited to, SURFLON S-111, SURFLON S-112, SURFLON S-113, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFAC F-470, F-1405, and F-474 (all manufactured by DIC CORPORATION); ZONYL™ TBS, FSP, FSA, FSN-100, FSN, FSO-100, FSO, FS-300, UR, CAPSTONE® FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.), and UNIDYNE DSN-403N (manufactured by DAIKIN INDUSTRIES). Of these, FS-3100, FS-34, and FS-300 (all manufactured by The Chemours Company), FT-110, FT-250, FT-251, FT-400S, FT-150, and FT-400SW (all manufactured by NEOS COMPANY LIMITED), POLYFOX PF-151N (manufactured by OMNOVA SOLUTIONS INC.), and UNIDYNE DSN-403N (manufactured by DAIKIN INDUSTRIES) are particularly preferable in terms of good printing quality, coloring in particular, and improvement on permeation, wettability, and uniform dyeing property to paper.

The proportion of the surfactant in ink is not particularly limited and can be suitably selected to suit to a particular application. It is preferably from 0.001 to 5 percent by mass and more preferably from 0.05 to 5 percent by mass in terms of excellent wettability and discharging stability and improvement on image quality.

<Defoaming Agent>

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.

<Preservatives and Fungicides>

The preservatives and fungicides are not particularly limited. A specific example is 1,2-benzisothiazolin-3-on.

<Corrosion Inhibitor>

The corrosion inhibitor has no particular limit. Examples thereof are acid sulfite and sodium thiosulfate.

<pH Regulator>

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25 degrees C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a print medium and the drying time of the ink is shortened. The pH of the ink is preferably from 7 to 12 and more preferably from 8 to 11 in terms of prevention of corrosion of metal materials contacting the ink.

<Pre-Processing Fluid>

The pre-processing fluid contains a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink. Also, other materials for use in known processing fluid can be used.

<Post-Processing Fluid>

The post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire printing area on a print medium or only the printed area.

<Print Medium>

The print medium for use in printing is not particularly limited. Plain paper, gloss paper, special paper, cloth, etc. are usable. Also, good images can be formed on a non-permeating substrate.

The non-permeating substrate has a surface with low moisture permeability and absorbency and includes a material having myriad of hollow spaces inside but not open to the outside. To be more quantitative, the substrate has a water-absorption amount of 10 mL/m$^2$ or less between the contact and 30 msec$^{1/2}$ after the contact according to Bristow method.

For example, plastic films of polyvinyl chloride resin, polyethylene terephthalate (PET), polypropylene, polyethylene, and polycarbonate are suitably used for the non-permeating substrate.

The print medium is not limited to articles used as typical print media. It is suitable to use building materials such as wall paper and floor material, cloth for apparel such as T-shirts, textile, and leather as the print medium. In addition, the configuration of the paths through which the print medium is transferred can be adjusted to accommodate ceramics, glass, metal, etc.

<Printed Matter>

The printed matter of the present disclosure includes a print medium and an image formed on the print medium with the ink of the present disclosure.

An inkjet printing device and an inkjet printing method are used to print the image on the print medium to obtain the printed matter.

<Printing Device and Printing Method>

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method of printing an image on the print medium using the device. The print medium means an article to which the ink or the various processing fluids can be attached at least temporarily.

The printing device may further optionally include a device relating to feeding, conveying, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 2:
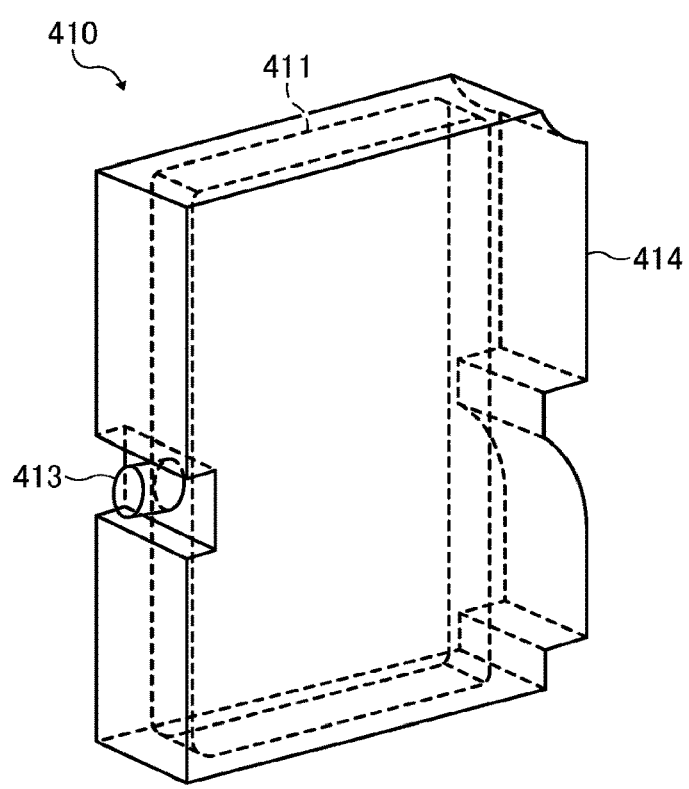
FIG. 2 is a perspective view of a main tank storing an ink according to an embodiment of the present disclosure.

The printing device of the present disclosure is described using an example with reference to FIG. 1 and FIG. 2. FIG. 1 is a perspective view illustrating the image printing device. FIG. 2 is a perspective view illustrating the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by re-applying ink. In addition, the three-dimensional solid object can be manufactured by processing a structure having a substrate such as a print medium printed with the ink as a molded processed product. The molded processed product is fabricated by, for example, heating drawing or punching a structure or printed matter having a sheet-like form, film-like form, etc.

The molded processed product is suitable as a product of molding performed after surface-decoration. Examples thereof are gauges or operation panels of vehicles, office machines, electric and electronic machines, cameras, etc.

An inkjet recording apparatus using the ink of the present disclosure as an inkjet ink will be described.

Figure 3:
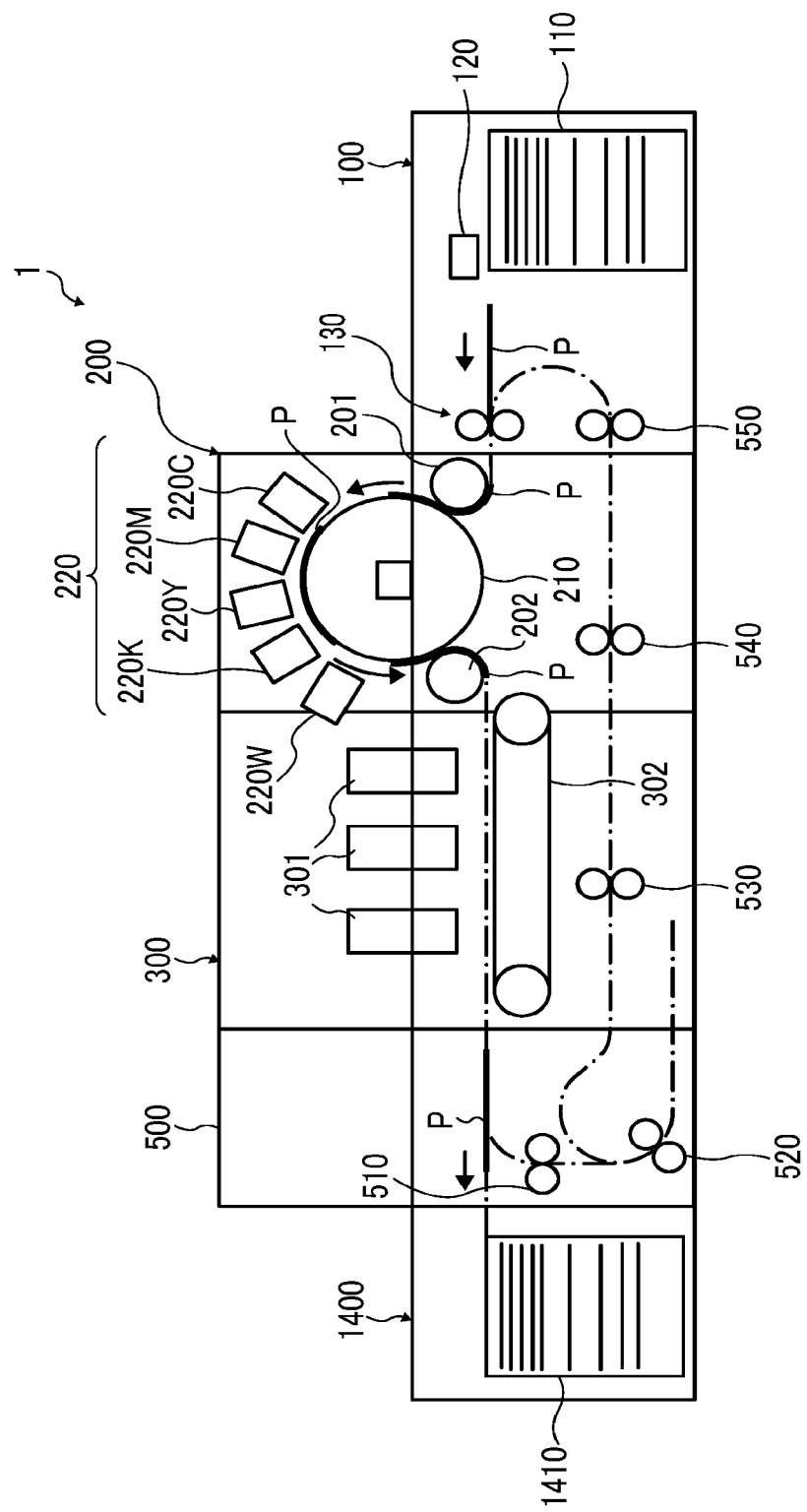
FIG. 3 is a view illustrating an image forming apparatus using an ink according to an embodiment of the present disclosure.

FIG. 3 is a view illustrating the whole structure of an image forming apparatus including an inkjet discharging unit. The image forming apparatus 1 includes a paper feeding unit 100, an image forming unit 200, a drying unit 300, a paper ejection unit 1400, and an overturning unit 500 for both-side printing.

One sheet P at a time is conveyed from a paper feeding tray 110 of the paper feeding unit 100 by a feeder 120, and after once stopped by a pair of registration rollers 130, fed to the image forming unit 200 at a predetermined timing.

In the image forming unit 200, the sheet P is conveyed to a sheet bearing drum 210 via a receiving trunk 201, and an inkjet head 220 forms an image on the sheet P on this sheet bearing drum 210. Here, in accordance with the print mode selected by the operator, the inkjet head 220 of which color is used for image formation is switched. Depending on the print image, the operator can select one of three print modes, namely, a monochrome mode, a full-color mode, and a full-color+white mode.

When the monochrome mode is selected, only an inkjet head 220K is used for image formation, and inkjet heads 220C, 220M, 220Y, and 220W remain protected with caps during the print operation. When the full-color mode is selected, the inkjet heads 220K, 220C, 220M, and 220Y are used for image formation, and the inkjet head 220W remains protected with a cap during the print operation. When the full-color+white mode is selected, all of the inkjet heads 220K, 220C, 220M, 220Y, and 220W are used for image formation. Subsequently, the sheet is conveyed to the drying unit 300 via a handover trunk 202.

In the drying unit 300, the sheet P is conveyed over a drying conveyor belt 302 and irradiated with UV light by a UV light irradiator 301. In this way, the printed image is dried.

The time during which the sheet P is irradiated with UV light is preferably 0.4 seconds or more but less than 1.2 seconds, and more preferably 0.6 seconds or more but less than 1.2 seconds In one-side printing, the sheet P passes the overturning unit 500 and is ejected to a paper ejection tray 1410 of the paper ejection unit 1400.

In both-side printing, the sheet P is conveyed by a bifurcating claw to an overturning roller 520 via a conveyor roller 510. Here, the sheet P is once stopped, and subsequently switches back to be conveyed in the reverse direction. The sheet P that has switched back rejoins the pair of registration rollers 130 via conveyor rollers 530, 540, and 550 for both-side pass. In this way, image formation on the back surface is started.

In the present disclosure, image forming, recording, printing, etc. represent the same meaning.

Print media, media, and printed matters represent the same meaning.

EXAMPLES

The present disclosure will be described more specifically by way of Examples and Comparative Examples. The present disclosure should not be construed as being limited to these Examples.

Pigment Dispersion Preparation Example 1

<Preparation of Surface Reformed Black Pigment Dispersion>

Acid deposition of a SENSIJET BLACK SDP2000 dispersion liquid (obtained from Sensient Technologies Corporation, carbon black, with pigment solid concentration of 14.5% by mass) (1 kg) was performed using a 0.1 N HCl aqueous solution. Then, the resultant was regulated to pH of 9 using a 10% by mass tetrabutyl ammonium hydroxide solution (methanol solution), to obtain a surface reformed black pigment dispersion 30 minutes later.

The obtained surface reformed black pigment dispersion contained a pigment that was bonded with at least one carboxylic acid group, sulfonic acid group, carboxylic acid tetrabutyl ammonium salt, or sulfonic acid tetrabutyl ammonium salt.

The surface reformed black pigment dispersion and ion-exchanged highly pure water were subjected to ultrafiltration through a dialysis membrane and then subjected to ultrasonic dispersion treatment to be concentrated to a pigment solid concentration of 25% by mass. The volume average particle diameter (D50) of the obtained surface reformed black pigment dispersion measured with a particle size distribution measuring instrument (obtained from Nikkiso Co., Ltd., NANOTRAC UPA-EX150) was 120 nm.

Pigment Dispersion Preparation Example 2

<Preparation of Surface Reformed Magenta Pigment Dispersion>

Acid deposition of a SMART MAGENTA 3122BA dispersion liquid (obtained from Sensient Technologies Corporation, a Pigment Red 122 surface treated emulsion, with a pigment solid concentration of 14.5% by mass) (1 kg) was performed using a 0.1 N HCl aqueous solution. Then, the resultant was regulated to pH of 9 using a 10% by mass tetraethyl ammonium hydroxide aqueous solution, to obtain the surface reformed magenta pigment dispersion 30 minutes later.

The obtained surface reformed magenta pigment dispersion contained a pigment that was bonded with at least one aminobenzoic acid group or aminobenzoic acid tetraethyl ammonium salt. The surface reformed magenta pigment dispersion and ion-exchanged highly pure water were subjected to ultrafiltration through a dialysis membrane and then subjected to ultrasonic dispersion treatment to be concentrated to a pigment solid concentration of 25% by mass. The volume average particle diameter (D50) of the obtained surface reformed magenta pigment dispersion measured in the same manner as in Pigment dispersion preparation example 1 was 104 nm.

Pigment Dispersion Preparation Example 3

<Preparation of Surface Reformed Cyan Pigment Dispersion>

Acid deposition of a SMART CYAN 3154BA dispersion liquid (obtained from Sensient Technologies Corporation, a Pigment Blue 15:4 surface treated emulsion, with a pigment solid concentration of 14.5% by mass) (1 kg) was performed using a 0.1 N HCl aqueous solution. Then, the resultant was regulated to pH of 9 using a 40% by mass benzyl trimethyl ammonium hydroxide solution (methanol solution), to obtain a surface reformed cyan pigment dispersion 30 minutes later.

The obtained surface reformed cyan pigment dispersion contained a pigment that was bonded with at least one aminobenzoic acid group or aminobenzoic acid benzyl trimethyl ammonium salt. The surface reformed cyan pigment dispersion and ion-exchanged highly pure water were subjected to ultrafiltration through a dialysis membrane and then subjected to ultrasonic dispersion treatment to be concentrated to a pigment solid concentration of 25% by mass. The volume average particle diameter (D50) of the obtained surface reformed cyan pigment dispersion measured in the same manner as in Pigment dispersion preparation example 1 was 116 nm.

Pigment Dispersion Preparation Example 4

<Preparation of Surface Reformed Yellow Pigment Dispersion>

Acid deposition of a SMART YELLOW 3074BA dispersion liquid (obtained from Sensient Technologies Corporation, a Pigment Yellow 74 surface treated emulsion, with a pigment solid concentration of 14.5% by mass) (1 kg) was performed using a 0.1 N HCl aqueous solution. Then, the resultant was regulated to pH of 9 using a 10% by mass tetrabutyl ammonium hydroxide solution (methanol solution), to obtain a surface reformed yellow pigment dispersion 30 minutes later.

The obtained surface reformed yellow pigment dispersion contained a pigment that was bonded with at least one aminobenzoic acid group or aminobenzoic acid tetrabutyl ammonium salt.

The obtained surface reformed yellow pigment dispersion and ion-exchanged highly pure water were subjected to ultrafiltration through a dialysis membrane and then subjected to ultrasonic dispersion treatment to be concentrated to a pigment solid concentration of 25% by mass.

The volume average particle diameter (D50) of the obtained surface reformed yellow pigment dispersion measured in the same manner as in Pigment dispersion preparation example 1 was 145 nm.

The symbols K, C, M, and Y in Tables 1 to 5 are abbreviations meaning use of the surface reformed black pigment dispersion, the surface reformed cyan pigment dispersion, the surface reformed magenta pigment dispersion, and the surface reformed yellow pigment dispersion, respectively.

The components used in Examples and Comparative Examples are as follows.
(Resin Emulsion)
The followings were used as resin emulsions.
JE-1056 (obtained from Seiko PMC Corporation, with Tg of 82 degrees C.)
BONCOAT CF-6140 (obtained from DIC Corporation, with Tg of 12 degrees C.)
BONCOAT CG-8400 (obtained from DIC Corporation, with Tg of 25 degrees C.)
SUPERFLEX 210 (obtained from DKS Co., Ltd., with Tg of 41 degrees C.)
The contents of the resin A and the resin B in the ink presented in Tables 1 to 5 are mix proportions equivalent to the resin emulsion solid content.
(Surfactant)
The followings were used as surfactants.
FS-300 (obtained from DuPont Corporation, a fluorosurfactant)
TEGO WET 270 (obtained from Evonik Corporation, a silicone-based surfactant)
(Preservative)
The following was used as a preservative.
PROXEL LV (obtained from Lonza Japan Ltd.)

Example 1

The components were mixed and stirred according to the prescription described in Table 1 (the unit of the values was % by mass), and the resultant mixture liquid was filtrated through a 0.5 micrometer polypropylene filter, to produce an ink of Example 1.

Examples 2 to 17 and Comparative Examples 1 to 20

The components were mixed and stirred according to the prescriptions described in Table 1 (the unit of the values was % by mass), and the resultant mixture liquids were filtrated through a 0.5 micrometer polypropylene filter, to produce inks of Examples 2 to 17 and Comparative examples 1 to 20.

[Evaluation of Inks and Images]

Regarding the inks of Examples 1 to 17 and Comparative Examples 1 to 20, storage stability of the inks and scratch resistance and tack force of images formed with the inks were evaluated in the evaluation manners described below.

<Scratch Resistance>

Each produced ink was filled in an ink container of the image forming apparatus illustrated in FIG. 3. Next, coat paper (OK TOP COAT+127.9 GSM PAPER, obtained from Oji Paper Co., Ltd.) was set as a print medium. Next, a solid image was formed at a resolution of 1,200 dpi. Next, the print medium was irradiated for 0.6 seconds with light (395 nm) of a UV-LED lamp (device name: SEMRAY UV 4003, obtained from Heraeus Holding GmbH) serving as an irradiation unit (irradiation device) and then left to stand at normal temperatures and a normal humidities (23° C., 50%) for 30 seconds for drying. After the drying, the solid image was scratched 20 times with a white portion of the coat paper cut into a square having a size of 1.2 cm on each side, to measure any strains of ink adhesion on the white portion of the coat paper using a reflective color spectrophotometric densitometer (obtained from X-Rite Inc.). A transfer density from which the background color of the coat paper used for scratching was subtracted was calculated, to evaluate scratch resistance according to the criteria described below. The ratings A and B are the tolerable range.

[Evaluation Criteria]
A: The transfer density was lower than 0.10.
B: The transfer density was 0.10 or higher but lower than 0.15.
C: The transfer density was 0.15 or higher but lower than 0.20.
D: The transfer density was 0.20 or higher.

<Storage Stability>

Each produced ink (40 g) was poured into a plastic container having a volume of 50 mL and stored in a thermostat bath of 70 degrees C. for 14 days. The change ratio of the viscosity after storage to the viscosity before storage was calculated according to the formula described below and evaluated according to the criteria described below.

$$\text{Viscosity change ratio (\%)} = \frac{\text{Ink viscosity after storage} - \text{Ink viscosity before storage}}{\text{Ink viscosity before storage}} \times 100$$

The ink viscosity was measured with a viscometer (RE80L, obtained from Toki Sangyo Co., Ltd.) at 25 degrees C. The ratings A and B are the tolerable range.

[Evaluation Criteria]

A: The viscosity change ratio was lower than 5%.
B: The viscosity change ratio was 5% or higher but lower than 7%.
C: The viscosity change ratio was 7% or higher but lower than 10%.
D: The viscosity change ratio was 10% or higher.

<Tack Force>

A printed matter printed under the same conditions as in the scratch test was cut out into an appropriate size, and the tack force in the printed layer of the printed matter was measured using a tacking tester (obtained from Rhesca Co., Ltd.: TAC-II). The measurement was performed under the conditions described below.

Measurement target: a printed matter that had passed 12 hours or longer since it was printed
Measurement temperature: 25 degrees C.
Humidity: 50% RH
Probe indenting speed: 5 mm/minute
Probe withdrawing speed: 5 mm/minute
Load: 38 g/cm$^2$
Contact time (pressurizing time): 2 seconds
Probe diameter 5 mm
Probe shape: a round pillar shape
Probe material: aluminum
Probe temperature: 100 degrees C.

TABLE 1

|   |   |   | Ex. 1 | Ex. 2 | Ex. 3 | Ex. 4 | Ex. 5 |
|---|---|---|---|---|---|---|---|
| Prescription | Solvent | 1,2-Propanediol | 20.00% | 20.00% | 20.00% | 20.00% | 20.00% |
|   |   | Highly pure water | | added to make the total 100% | | | |
|   | Coloring material | Pigment dispersion | 5.00% | 5.00% | 5.00% | 5.00% | 5.00% |
|   | Surfactant | FS-300 | 0.40% | 0.40% | 0.40% | 0.40% | 0.40% |
|   |   | TEGO WET 270 | — | — | — | — | — |
|   | Preservative | PROXEL L V | 0.01% | 0.01% | 0.01% | 0.01% | 0.01% |
|   | Resin A | JE-1056 (Tg: 82° C.) | 3.00% | 4.00% | 5.00% | 5.80% | 6.67% |
|   | Resin B | SUPERFLEX 210 (Tg: 41° C.) | 3.00% | 4.00% | 1.00% | 1.16% | 1.33% |
|   |   | BONCOAT CG-8400 (Tg: 25° C.) | — | — | — | — | — |
|   |   | BONCOAT CF-6140 (Tg: 12° C.) | — | — | — | — | — |
|   |   | Resin A/Resin B ratio | 1.0 | 1.0 | 5.0 | 5.0 | 5.0 |
|   | Wax | AQUACER 593 | 0.30% | 0.30% | 0.30% | 0.30% | 0.30% |
| Evaluation result |   | Tack force [Gf] (6-13) | 10 | 13 | 7 | 8 | 8 |
|   | Scratch resistance | K | A | A | A | A | A |
|   |   | C | A | A | B | B | B |
|   |   | M | A | A | B | B | B |
|   |   | Y | B | A | A | A | A |
|   | Storage stability | K | B | B | A | A | A |
|   |   | C | A | B | A | A | A |
|   |   | M | B | B | A | A | A |
|   |   | Y | B | B | A | A | A |

|   |   |   | Ex. 6 | Ex. 7 | Ex. 8 | Ex. 9 |
|---|---|---|---|---|---|---|
| Prescription | Solvent | 1,2-Propanediol | 20.00% | 20.00% | 20.00% | 20.00% |
|   |   | Highly pure water | | added to make the total 100% | | |
|   | Coloring material | Pigment dispersion | 5.00% | 5.00% | 5.00% | 5.00% |
|   | Surfactant | FS-300 | 0.40% | 0.40% | 0.40% | 0.40% |
|   |   | TEGO WET 270 | — | — | — | 0.05% |
|   | Preservative | PROXEL L V | 0.01% | 0.01% | 0.01% | 0.01% |
|   | Resin A | JE-1056 (Tg: 82° C.) | 2.00% | 2.33% | 2.67% | 2.00% |
|   | Resin B | SUPERFLEX 210 (Tg: 41° C.) | 4.00% | 4.67% | 5.33% | 4.00% |
|   |   | BONCOAT CG-8400 (Tg: 25° C.) | — | — | — | — |
|   |   | BONCOAT CF-6140 (Tg: 12° C.) | — | — | — | — |
|   |   | Resin A/Resin B ratio | 0.5 | 0.5 | 0.5 | 0.5 |
|   | Wax | AQUACER 593 | 0.30% | 0.30% | 0.30% | 0.30% |
| Evaluation result |   | Tack force [Gf] (6-13) | 11 | 12 | 13 | 11 |
|   | Scratch resistance | K | A | A | A | A |
|   |   | C | A | A | A | A |
|   |   | M | A | A | A | A |
|   |   | Y | A | A | A | A |
|   | Storage stability | K | B | B | B | A |
|   |   | C | B | B | B | A |
|   |   | M | B | B | B | A |
|   |   | Y | B | B | B | A |

TABLE 2

|   |   |   | Ex. 10 | Ex. 11 | Ex. 12 | Ex. 13 | Ex. 14 |
|---|---|---|---|---|---|---|---|
| Prescription | Solvent | 1,2-Propanediol | 20.00% | 20.00% | 20.00% | 20.00% | 20.00% |
|   |   | Highly pure water | | added to make the total 100% | | | |
|   | Coloring material | Pigment dispersion | 5.00% | 5.00% | 5.00% | 5.00% | 5.00% |
|   | Surfactant | FS-300 | 0.40% | 0.40% | 0.40% | 0.40% | 0.40% |
|   |   | TEGO WET 270 | 1.00% | — | — | — | — |

TABLE 2-continued

|  |  |  |  |  |  |  |  |
|---|---|---|---|---|---|---|---|
| Preservative | PROXEL L V |  | 0.01% | 0.01% | 0.01% | 0.01% | 0.01% |
| Resin A | JE-1056 (Tg: 82° C.) |  | 2.00% | 3.00% | 5.00% | 2.00% | 3.00% |
| Resin B | SUPERFLEX 210 (Tg: 41° C.) |  | 4.00% | — | — | — | — |
|  | BONCOAT CG-8400 (Tg: 25° C.) |  | — | 3.00% | 1.00% | 4.00% | — |
|  | BONCOAT CF-6140 (Tg: 12° C.) |  | — | — | — | — | 3.00% |
|  | Resin A/Resin B ratio |  | 0.5 | 1.0 | 5.0 | 0.5 | 1.0 |
| Wax | AQUACER 593 |  | 0.30% | 0.30% | 0.30% | 0.30% | 0.30% |
| Evaluation result | Tack force [Gf] (6-13) |  | 13 | 10 | 9 | 12 | 11 |
|  | Scratch | K | A | A | A | A | A |
|  | resistance | C | A | A | A | A | A |
|  |  | M | A | A | A | A | A |
|  |  | Y | A | A | A | A | A |
|  | Storage | K | A | B | A | B | B |
|  | stability | C | A | B | A | B | B |
|  |  | M | A | B | A | B | B |
|  |  | Y | A | B | A | B | B |

|  |  |  | Ex. 15 | Ex. 16 | Ex. 17 |
|---|---|---|---|---|---|
| Prescription | Solvent | 1,2-Propanediol | 20.00% | 20.00% | 20.00% |
|  |  | Highly pure water | added to make the total 100% | | |
|  | Coloring material | Pigment dispersion | 5.00% | 5.00% | 5.00% |
|  | Surfactant | FS-300 | 0.40% | 0.40% | 0.40% |
|  |  | TEGO WET 270 | — | — | — |
|  | Preservative | PROXEL L V | 0.01% | 0.01% | 0.01% |
|  | Resin A | JE-1056 (Tg: 82° C.) | 5.00% | 2.00% | 7.00% |
|  | Resin B | SUPERFLEX 210 (Tg: 41° C.) | — | — | — |
|  |  | BONCOAT CG-8400 (Tg: 25° C.) | — | — | — |
|  |  | BONCOAT CF-6140 (Tg: 12° C.) | 1.00% | 4.00% | — |
|  |  | Resin A/Resin B ratio | 5.0 | 0.5 | 0.0 |
|  | Wax | AQUACER 593 | 0.30% | 0.30% | 0.30% |
| Evaluation result | Tack force [Gf] (6-13) |  | 11 | 13 | 7 |
|  | Scratch | K | A | A | B |
|  | resistance | C | A | A | B |
|  |  | M | A | A | B |
|  |  | Y | A | A | B |
|  | Storage | K | B | B | A |
|  | stability | C | B | B | A |
|  |  | M | B | B | A |
|  |  | Y | B | B | A |

TABLE 3

|  |  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Prescription | Solvent | 1,2-Propanediol | 20.00% | 20.00% | 20.00% | 20.00% | 20.00% | 20.00% | 20.00% |
|  |  | Highly pure water | added to make the total 100% | | | | | | |
|  | Coloring material | Pigment dispersion | 5.00% | 5.00% | 5.00% | 5.00% | 5.00% | 5.00% | 5.00% |
|  | Surfactant | FS-300 | 0.40% | 0.40% | 0.40% | 0.40% | 0.40% | 0.40% | 0.40% |
|  |  | TEGO WET 270 | — | — | — | — | — | — | — |
|  | Preservative | PROXEL L V | 0.01% | 0.01% | 0.01% | 0.01% | 0.01% | 0.01% | 0.01% |
|  | Resin A | JE-1056 (Tg: 82° C.) | 6.00% | 5.00% | — | — | — | — | — |
|  | Resin B | SUPERFLEX 210 (Tg: 41° C.) | — | — | 5.00% | 6.00% | 5.00% | — | — |
|  |  | BONCOAT CG-8400 (Tg: 25° C.) | — | — | — | — | — | 6.00% | 7.00% |
|  |  | BONCOAT CF-6140 (Tg: 12° C.) | — | — | — | — | — | — | — |
|  |  | Resin A/Resin B ratio | 0.0 | 0.0 | 0.0 | 0.0 | 0.0 | 0.0 | 0.0 |
|  | Wax | AQUACER 593 | 0.30% | 0.30% | 0.30% | 0.30% | 0.30% | 0.30% | 0.30% |
| Evaluation result | Tack force [Gf] (6-13) |  | 5 | 3 | 20 | 25 | 27 | 30 | 30 |
|  | Scratch | K | C | D | A | A | A | A | A |
|  | resistance | C | C | D | A | A | A | A | A |
|  |  | M | C | D | A | A | A | A | A |
|  |  | Y | C | D | A | A | A | A | A |
|  | Storage | K | A | A | C | C | D | D | D |
|  | stability | C | A | A | C | C | D | C | D |
|  |  | M | A | A | C | D | D | D | D |
|  |  | Y | A | A | C | C | C | C | C |

TABLE 4

|  |  |  | Comp. Ex. 8 | Comp. Ex. 9 | Comp. Ex. 10 | Comp. Ex. 11 | Comp. Ex. 12 | Comp. Ex. 13 | Comp. Ex. 14 |
|---|---|---|---|---|---|---|---|---|---|
| Prescription | Solvent | 1,2-Propanediol | 20.00% | 20.00% | 20.00% | 20.00% | 20.00% | 20.00% | 20.00% |
|  |  | Highly pure water |  |  | added to make the total 100% |  |  |  |  |
|  | Coloring material | Pigment dispersion | 5.00% | 5.00% | 5.00% | 5.00% | 5.00% | 5.00% | 5.00% |
|  | Surfactant | FS-300 | 0.40% | 0.40% | 0.40% | 0.40% | 0.40% | 0.40% | 0.40% |
|  |  | TEGO WET 270 | — | — | — | — | — | — | — |
|  | Preservative | PROXEL L V | 0.01% | 0.01% | 0.01% | 0.01% | 0.01% | 0.01% | 0.01% |
|  | Resin A | JE-1056 (Tg: 82° C.) | — | — | 5.10% | 5.10% | 5.85% | 5.10% | 5.85% |
|  | Resin B | SUPERFLEX 210 (Tg: 41° C.) | — | — | 0.90% | 0.90% | 1.10% | — | — |
|  |  | BONCOAT CG-8400 (Tg: 25° C.) | — | — | — | — | — | 0.90% | 1.10% |
|  |  | BONCOAT CF-6140 (Tg: 12° C.) | 6.00% | 7.00% | — | — | — | — | — |
|  |  | Resin A/Resin B ratio | 0.0 | 0.0 | 5.7 | 5.7 | 5.3 | 5.7 | 5.3 |
|  | Wax | AQUACER 593 | 0.30% | 0.30% | 0.30% | 0.30% | 0.30% | 0.30% | 0.30% |
| Evaluation result |  | Tack force [Gf] (6-13) | 33 | 33 | 3 | 3 | 4 | 4 | 4 |
|  | Scratch resistance | K | A | A | C | C | C | C | C |
|  |  | C | A | A | D | D | D | D | D |
|  |  | M | A | A | D | D | D | D | D |
|  |  | Y | A | A | D | D | D | C | D |
|  | Storage stability | K | D | D | A | A | A | A | A |
|  |  | C | D | D | A | A | A | A | A |
|  |  | M | C | D | A | A | A | A | A |
|  |  | Y | D | D | A | A | A | A | A |

TABLE 5

|  |  |  | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Prescription | Solvent | 1,2-Propanediol | 20.00% | 20.00% | 20.00% | 20.00% | 20.00% | 20.00% |
|  |  | Highly pure water |  | added to make the total 100% |  |  |  |  |
|  | Coloring material | Pigment dispersion | 5.00% | 5.00% | 5.00% | 5.00% | 5.00% | 5.00% |
|  | Surfactant | FS-300 | 0.40% | 0.40% | 0.40% | 0.40% | 0.40% | 0.40% |
|  |  | TEGO WET 270 | — | — | — | — | — | 1.10% |
|  | Preservative | PROXEL L V | 0.01% | 0.01% | 0.01% | 0.01% | 0.01% | 0.01% |
|  | Resin A | JE-1056 (Tg: 82° C.) | 5.10% | 5.85% | 1.50% | 2.00% | 2.20% | 2.00% |
|  | Resin B | SUPERFLEX 210 (Tg: 41° C.) | — | — | 4.50% | 5.00% | 5.80% | 4.00% |
|  |  | BONCOAT CG-8400 (Tg: 25° C) | — | — | — | — | — | — |
|  |  | BONCOAT CF-6140 (Tg: 12° C.) | 0.90% | 1.10% | — | — | — | — |
|  |  | Resin A/Resin B ratio | 5.7 | 5.3 | 0.3 | 0.4 | 0.4 | 0.5 |
|  | Wax | AQUACER 593 | 0.30% | 0.30% | 0.30% | 0.30% | 0.30% |  |
| Evaluation result |  | Tack force [Gf] (6-13) | 5 | 5 | 22 | 25 | 28 | 17 |
|  | Scratch resistance | K | C | C | A | A | A | A |
|  |  | C | D | C | A | A | A | A |
|  |  | M | C | D | A | A | A | A |
|  |  | Y | C | D | A | A | A | A |
|  | Storage stability | K | A | A | C | D | D | B |
|  |  | C | A | A | D | D | C | C |
|  |  | M | A | A | D | D | D | D |
|  |  | Y | A | A | C | C | C | B |

From comparison between Examples and Comparative Examples, it can be seen that the storage property and scratch resistance were satisfied at the same time only when the tack force of the image at the probe temperature of 100 degrees C. was 6 gf or greater but 13 gf or less.

From comparison between Examples and Comparative Examples 1 and 2, it can be seen that scratch resistance might not be ensured with only the resin A.

From comparison between Examples and Comparative Examples 3 to 9, it can be seen that the storage property was not ensured with only the resin B.

From comparison between Examples and Comparative Examples 10 to 16, it can be seen that the scratch property tended to be poor when the ratio (resin A)/(resin B) was greater than 5.

From comparison between Example 6 and Comparative Examples 9 and 10, it can be seen that the storage property became even better when a silicone-based surfactant WET-270 was added. From comparison with Comparative Example 20, it can be seen that the storage property tended to be poor when WET-270 was added by 1% or greater.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An ink, comprising:
a pigment;
water; and
a resin,
wherein an image formed with the ink on a print medium has a tack force of 6 gf or greater but 13 gf or less when measured at a probe temperature of 100 degrees C.,
wherein the image is a solid image formed at a resolution of 1,200 dpi, subsequently irradiated with light of 395 nm for 0.6 seconds, and left to stand at normal temperatures and normal humidities for 30 seconds.

2. The ink according to claim 1,
wherein the resin includes:
a resin A having a glass transition temperature Tg of 80 degrees C. or higher; and
a resin B having a glass transition temperature Tg of 12 degrees C. or higher but 41 degrees C. or lower.

3. The ink according to claim 2,
wherein a mass ratio of the resin A to the resin B is 0.5 or greater but 5.0 or less.

4. The ink according to claim 1, further comprising:
a silicone-based surfactant in an amount of 0.05% by mass or greater but 1.00% by mass or less.

5. An image forming apparatus, comprising:
the ink according to claim 1; and
a discharging unit configured to discharge the ink to a print medium.

6. The image forming apparatus according to claim 5, further comprising
an irradiation unit configured to irradiate the print medium to which the ink is applied with ultraviolet rays.

7. An image forming method, comprising;
discharging the ink according to claim 1 to a print medium to form an image.

8. The image forming method according to claim 7, further comprising
irradiating the print medium to which the ink is applied with ultraviolet rays.

9. The ink according to claim 1, wherein said resin has an average particle diameter of 10 to 1,000 nm.

10. The ink according to claim 1, wherein a proportion of resin in said ink is 1-30% by mass to a total content of said ink.

11. The ink according to claim 1, wherein said ink comprises 20-60 percent by mass of water.

12. The ink according to claim 1, further comprising a water-soluble organic solvent in an amount of 20 to 60 percent by mass.

13. The ink according to claim 1, wherein said resin is at least one selected from the group consisting of a urethane resin a polyester resin, an acrylic-based resin, a vinyl acetate-based resin, a styrene-based resin, a butadiene-based resin, a styrene-butadiene-based resin, a vinylchloride-based resin, an acrylic styrene-based resin and an acrylic silicone-based resin.

* * * * *